United States Patent [19]
White et al.

[11] Patent Number: 5,947,887
[45] Date of Patent: Sep. 7, 1999

[54] EXTRUDER GLASS-MELTER PROCESS FOR VITRIFICATION OF NUCLEAR AND OTHER TOXIC WASTES

[75] Inventors: Donald H. White, Tucson, Ariz.; Asher N. Sembira, Beer Sheva; David Wolf, Omar, both of Israel

[73] Assignee: Extruder Vitrification Group, L.L.C., Tucson, Ariz.

[21] Appl. No.: 09/053,340

[22] Filed: Apr. 1, 1998

Related U.S. Application Data

[63] Continuation-in-part of application No. 08/604,582, Feb. 21, 1996.

[51] Int. Cl.$^6$ ........................................... A62D 3/00
[52] U.S. Cl. .................. 588/252; 65/134.8; 252/629; 405/128; 588/256
[58] Field of Search ................... 588/252, 256, 588/257; 405/128, 131; 252/628, 629; 65/134.8, 27, 134.6

[56] References Cited

U.S. PATENT DOCUMENTS

| | | | |
|---|---|---|---|
| 4,299,611 | 11/1981 | Penberthy | 65/134.8 X |
| 4,778,626 | 10/1988 | Ramm et al. | 252/628 |
| 4,855,082 | 8/1989 | Duivelaar | 252/629 |
| 5,304,708 | 4/1994 | Buehler | 588/252 X |
| 5,377,604 | 1/1995 | Pichat | 588/257 X |
| 5,424,042 | 6/1995 | Mason et al. | 588/252 X |
| 5,430,236 | 7/1995 | De Macedo et al. | 588/252 |
| 5,434,333 | 7/1995 | Jantzen et al. | 588/252 X |
| 5,571,301 | 11/1996 | Yamaura et al. | 588/257 X |
| 5,573,564 | 11/1996 | Richards | 65/134.8 X |
| 5,611,766 | 3/1997 | Carle et al. | 588/252 |

FOREIGN PATENT DOCUMENTS 2150131  6/1985  United Kingdom .................. 65/134.8

OTHER PUBLICATIONS

R.B. Bird, W.E. Stewart and E.N. Lightfoot, "Transport Phenomena," J. Wiley & Sons (1960), pp. 276–279.
S. Middleman, "Fundamentals of Polymer Processing," McGraw–Hill Book Co. (1977), pp. 131–137 and 371.

*Primary Examiner*—Dennis L. Taylor
*Attorney, Agent, or Firm*—Antonio R. Durando

[57] ABSTRACT

A toxic waste and glass frit are fed into an extruder having a helical screw. The glass frit, as well as any glassy material and glass-forming component in the waste, are melted in the extruder as the screw transports the waste and the frit through the extruder. The screw further mixes the waste and the frit and homogenizes the resulting mixture. The extruder is designed to generate high shear rates and high internal friction and at least a portion of the heat for melting is produced by such friction. A vitrified mass of the toxic waste is discharged from the extruder. The vitrified mass can be stored as is or can be pelletized and/or encapsulated.

21 Claims, 6 Drawing Sheets

EXTRUDER GLASS-MELTER PROCESS FOR VITRIFICATION OF NUCLEAR AND OTHER TOXIC WASTES

RELATED APPLICATIONS

This application is a continuation-in-part of Ser. No. 08/604,582, filed on Feb. 21, 1996, by the same inventors and currently pending.

BACKGROUND OF THE INVENTION

1. Field of the Invention

The present invention relates to a process and apparatus for forming inorganic glassy mixtures, in part from toxic wastes, by the process called vitrification, so that the toxic wastes become an integral part of the vitrified glasses. The invention also provides a method of encapsulating high level nuclear wastes and other toxic wastes by vitrification.

2. Description of the Prior Art

Glass melters have been developed in the U.S., Europe, and Japan for the conversion of high level radioactive waste (HLW) to borosilicate glass for disposal. Laboratory and pilot scale operations have been conducted to develop equipment, glass compositions, and control methods. The melters developed fall into four categories: batch melters, continuous pot melters, Joule-heated ceramic-lined melters, and stirred melters. The newest design, the stirred melter, combines the higher production rates and higher glass quality features of the joule-heated melters with the lower-cost, compact simple maintenance of the pot melters.

The first waste glass melters were designed for batch operations, and were a direct increase in scale from crucible tests. This approach was found unsuitable for HLW production facilities because of slow melt rates caused by slow heat transfer from the external heaters through the canister into the reacting batch. Lack of agitation and lack of temperature uniformity made it difficult to homogenize the glass. Calcination of feed before introduction into the canister increased the melt rate, but also increased the tendency for crystal formation in the glass and entrained waste in the calciner off-gas system. This method was finally eliminated for HLW based on the large number of melters, operating in parallel, required to meet the production rates necessary to dispose of HLW inventories. The method remains attractive for small facilities where melt rates are not restrictive, such as the on-line verification of certain radioactive wastes. Subsequent improvements in melter materials and glass compositions permit the slow production of small amounts of waste glass with satisfactory durabilities.

The second class of melters developed consisted of continuous pot melters. In this type the melt rate was increased by increasing the diameter of the pot, by direct heating of the pot by radio frequency induction heating, and by continuous feeding of raw materials. Glass homogeneity was improved by using gas bubblers to agitate the melt. The largest of this type of melter is the French Atelier de Vitrification de Mercoule (AVM) system which melts about 25 kilograms per hour. This is the processing rate limit per pot melter using dried feed. With slurry feeding the melter capacity limit would be about one half of this, or 12 kilograms per hour per melter. The melter design temperature is limited to about 1150° C. by creep resistance of the Inconel® alloy used for the pot. The use of this system was not practical because of the large number of parallel melters, calciners, and off-gas scrubbing systems required. However, this class of melter is modularized, with parts that are relatively easy to replace. An additional benefit of this approach is that only the failed components need be replaced, minimizing the amount of waste generated with melter changeout, and maximizing the useful life of each component. This approach therefore has merit when dealing with homogeneous wastes, and where melt rate restrictions are not limiting. For non-homogeneous wastes the close coupling of the calciner/incinerator functions with the melter is not desirable, since it is necessary to classify the calcined waste to remove large metallic pieces.

A third category of melters consists of the joule-heated, ceramic-lined melters. This is the result of several generations of melter development based originally on commercial, electrically heated melters. Major differences between HLW melters and ceramic-lined melters have been:

the use of metal shells to contain glass contact refractories and thermal insulation;

the development of specialized slurry feeding and glass pouring systems; and the use of nickel based alloys for electrodes carefully matched with glass composition control.

This type of melter is lined with refractory, and the glass is directly heated by conducting electricity through the melt. This system with slurry feeding has been selected for all the production melter systems in the U.S., W. Germany, and Japan because of the higher production rates and high glass quality. The size of these systems is effectively limited only by operating facility constraints (e.g., cell space, crane capacity), since all the structural support is provided by a room temperature metal box which contains the refractory. The Inconel® 690 alloy electrodes only need to be self-supporting, and high current densities are possible on the faces of the electrodes. Therefore, nominal melt temperatures can be as high as 1150° C., which is only 200° C. lower than the alloy melting point. Glass production rates are proportional to the surface area of the melt, but convection caused by the joule heating is enhanced as the size of the melter is increased, so larger melters have proportionately higher melt rates. Small laboratory melters operate below 22 kilograms per hour per square meter, whereas production melters operate at about 39 kilograms per hour per square meter. Melt rates can be doubled by dry feeding. The combination of higher temperature and convective mixing makes the glass homogeneous. The major difficulty in slurry-fed ceramic-lined designs is the large number of individual refractory bricks, supporting shell and other components that must be assembled to make this type of melter. This complexity increases the melter construction, installation, and disposal costs. In radioactive service only limited repair is possible, so failure of individual components can require removal and disposal of the entire assembly.

A fourth class of melters, known as Advanced or Stirred Melters, has been developed, evolving out of various melt reaction studies, computerized staged reaction models, organic combustion models and melter redox models generated in support of the glass melter in the Defense Waste Processing Facility (DWPF) constructed at the Savannah River Plant in Aiken, S.C. Evaluation of the melt reaction sequence indicated that the melter operating temperature need not be as high as the nominal 1150° C. to assure adequate glass durability. This made possible the consideration of melter designs where Inconel® 690 components carry dynamic loads, which is not possible with the present nominal operating temperature of 1150° C. Several melter design companies were involved in determining what commercial technology might be applicable. The most promising of these was a proposal by Associated Technical Consultants to develop mechanically stirred melters comparable to those originally investigated by Owens-Illinois, Inc., of Toledo, Ohio. This approach offered the possibility of combining the larger size of the continuous pot melters with the higher production rates of mechanically stirred melters. Owens-Illinois, Inc., demonstrated a compact 0.57 cubic meter melt chamber that produced 10,900 kilograms per day of partially melted commercial glass from raw materials. It featured a simple geometry, with a simple mechanical drive system, plus rapid start, drain and restart capabilities, all of which are desirable properties for radioactive service.

One version of conventional high level radioactive waste vitrification involves introducing the feed slurry from the top of the melter and forming a cold cap on the melt surface as the water evaporates and is removed by the off-gas system. Three electrodes supply energy directly to the melt. The cold cap melts from the bottom and forms the borosilicate waste glass. Molten glass flows from the bottom of the melter up through a riser and falls into a stainless steel canister by either periodic batch pouring or continuously. Glass pouring is activated by airlifting.

As described above, a slurry feed enters the melter and forms a feedpile or cold cap on the surface of the glass pool which is composed of two parts—a boiling slurry layer where water is driven out of the feed, and an underlying crust layer where decomposition of the waste chemicals and glass formers occurs to produce a borosilicate glass. Newly formed glass sloughs off the bottom of the feedpile, enters and mixes with the glass already in the glass pool at 1150° C., and is periodically poured into a stainless steel canister. Here the molten glass cools and solidifies to form the final product of radioactive waste glass.

Conventional glass melters for vitrification of nuclear wastes depend upon natural convection in the glass pool to provide reasonably good mixing of fresh glass from the feedpile with glass in the melt pool. Thus, a retention time of some 40 to 80 hours in the melter is required to complete this operation.

One of the waste acceptance specifications is that the chemical composition of the waste glass must be specified for all elements, except oxygen, which are present in concentrations greater than 0.5 weight percent. Various processing requirements must also be satisfied. For example, the slurry must be pumpable between tanks and it must form a homogeneous mixture. In the melter, the glass must be in a specified viscosity range so that it mixes well and can be poured into a canister. The oxidation state of various chemical species in the glass must also be controlled to prevent excessive foaming and possible precipitation of metals on the bottom of the glass pool. Finally, the glass composition must fall within the envelope of acceptable glass compositions which show good durability as measured by the leach test. The above requirements on chemical composition, processibility, and durability make it imperative that the vitrification process be well controlled.

One test as a measure of the quality of the glass incorporating the nuclear wastes is a static leach test in deionized water at 90° C. for 28 days. The glass must have a release rate less than 1 gram per square meter per day for Na, Si, B, Cs-137, and U-238. This requirement includes two elements and two radionuclides that have to be measured and reported. Generally, Na and Si are measured in leachates and U-238 can be inferred from the elemental U release rate, which is also generally measured during testing. Measuring Cs-137 during testing is difficult because of the radiation dose rate associated with it.

U.S. Pat. No. 4,778,626 teaches how a dry, pourable particulate mixture of nuclear wastes and synthetic rock-forming components can be produced. However, the nuclear wastes have higher leaching rates than in conventional borosilicate glass vitrification. This patent also describes how a dry nuclear waste can be prepared.

U.S. Pat. No. 4,855,082 teaches how common silica glasses can be used to encapsulate dangerous waste materials. Such silica glasses have melting points of about 800° C., compared to the 1150–1400° C. of the special borosilicate glasses used in conventional vitrification of high level nuclear wastes, whereby heating costs are lower and corrosivity of the glass is much less. This process has two serious disadvantages, namely: (a) that the leaching rates of the nuclear wastes are some 4-fold greater than for the special borosilicate glasses; and (b) that a portion of the nuclear wastes is not an integral part of the glass itself.

FIG. 2 of U.S. Pat. No. 4,855,082 shows a helical blade on a shaft. The helical blade, which defines a uniform deep channel, is used to mix a solid waste with molten glass. The solid waste and the molten glass are prepared separately prior to being fed into the apparatus. The two feed materials are mixed by radial blades near the outlet of the apparatus, partially cooled and extruded from the apparatus as a strand. Due to the deep channel defined by the helical blade, the helical blade acts much like a "solid conveyor" and produces negligible shear rates. U.S. Pat. No. 4,855,082 does not contemplate formation of a glass melt within the disclosed apparatus, which is not capable of forming a glass melt from components of toxic wastes to supplement a glass frit feedstock.

The present invention is directed at providing a process and apparatus for overcoming the problems of prior-art melters by exploiting the high pressures and high shear rates produced by extruders for the purpose of implementing a relatively-low temperature continuous vitrification process. No prior-art equipment used for vitrification is able to melt a "thermoplastic" glass frit by producing sufficiently high pressures and corresponding high shear rates because such shear rates can be generated only by very shallow channels, such as produced in the metering section of an extruder having channels generally less than one tenth of the diameter of the extruder screw. The helical blades used in prior-art mixing vessels are unable to generate such high pressures and high shear rates because the generation of high pressure by compression requires a decreasing channel depth and the production of high shear rates requires a shallow channel depth, both of which are characteristics of extruders. Thus, the helical blades typically used in prior-art vitrification equipment cannot move glass melt mixes in the 700–900° C. temperature range due to their excessively high viscosities in this range. This can be done only by generating sufficiently high shear rates.

As well understood in the art of extrusion, very viscous liquid materials can barely be poured from a container by gravity. Hence, when such materials are placed under high shear rates (wherein one layer is moved rapidly away from its adjacent layer), internal friction is generated within the viscous liquid, which in turn generates heat. Thus, the energy of the electric motor turning the extruder screw under high torque is converted into frictional heat, which causes the viscous liquid to rise in temperature with a resulting lower viscosity. These extruder features make this invention possible.

SUMMARY OF THE INVENTION

An object of the present invention is to provide a process in which an extruder arrangement designed for high temperature operation replaces completely the ceramic-lined glass melters utilized in vitrifying high-level and/or other radioactive wastes and/or various toxic wastes. This specially-designed extruder arrangement can include a single screw extruder having a tapered or constant-diameter barrel, a twin-screw extruder or any other type of extruder and exhibits one or more of the following features:

1) It is constructed of high-temperature metal alloys, such as Inconel® 690, and is capable of operating with the higher glass melt viscosities existing at temperatures of 1075° C. or lower, such as 700–900° C.

2) It is designed with narrow channels of minimal height in order to minimize glass melt hold-up in the extruder and possessing the good mixing characteristics of a mixing screw in a single screw extruder or the good mixing characteristics of a twin screw extruder. Maximum channel height suitable for this invention is about one tenth the diameter of the extruder screw in order to produce the high shear rates in the metering section that are required for the invention. These features also result in high throughputs and low residence times. Thus, production rates per unit of equipment size are many times greater than in conventional ceramic glass melters.

3) It is designed as a multi-stage extruder, or with two or more extruders in series, so that all of the processes involved in glass melting and its homogenization can take place in the extruder; e.g., drying in a first stage, gas removal in a second stage, and glass melt homogenization in a third stage.

4) To the extent desired and necessary to supplement heat generation by viscous dissipation, it is designed for induction, radiant or other indirect heating, rather than for heating by means of electrodes. This is made possible by the modular design features of extruders, and by their suitability for operation at lower temperatures and higher viscosities than prior-art vitrification equipment, so that at least a portion of the needed heat input is provided by viscous dissipation, i.e., internal friction in the glass melt.

5) It is designed for operation under pressure to minimize loss of radioactive gases and vapors, which is not possible in conventional ceramic glass melters.

6) It is designed with several feed ports along its length to make it possible to adjust glass composition for maximum melting rates. The screw or screws are preferably arranged to generate lower pressures at the ports.

7) It is designed with the barrel or barrels having many sections held together with special fasteners to facilitate robotic disassembly and maintenance operations.

Another object of this invention is to take advantage of the inherent flexibility of extruder design, so that modified designs can be provided for dry feed streams, slurry feed streams, liquid feed streams and multiple feed streams.

Still another object of this invention is to provide a process wherein an extruder is utilized as a "pretreater" to partially melt, mix and pressurize toxic waste feedstocks that can then be pumped by the extruder into a conventional ceramic glass melter. This allows the option of redesigning the ceramic glass melter, if desired, to provide an improved overall process.

Yet another object of this invention is to provide a dual extruder process wherein one extruder produces a toxic waste glass melt and the other extruder encapsulates the product of the first extruder with a "pure" glass melt so that, in the solid state, less leaching of toxic metals occurs.

Another goal of the invention is to provide a process wherein an extruder serves as a dewatering/calcining stage which could replace conventional calcining stages used in some glass vitrification processes, such as the French process.

Still another objective is to provide a process wherein the glass composition is changed to achieve improved properties by taking advantage of the fact that an extruder can operate at lower temperatures and higher glass melt viscosities than conventional glass-melting equipment.

Finally, another object of the invention is to provide a process operated at sufficiently high output viscosity that the glass melt product can be readily pelletized to any desired size for easy pouring into storage containers. Also, for high level radioactive wastes, this would allow the additional pouring of molten lead into the storage containers to absorb radioactive rays. Alternatively, the pelletized product could be stored so that air or an inert gas could be circulated through its voids to control temperature during storage.

The preceding objectives, as well as others which will become apparent as the description proceeds, are achieved by the invention.

One aspect of the invention resides in a method of treating waste substances. The method comprises the step of introducing material into extruder means. The material includes a first constituent selected from the group consisting of wastes and a second constituent selected from the group consisting of glass and glass formers. The method further comprises the step of melting at least a portion of the second constituent in the extruder means by the application of sufficiently high shear rates to produce heat by viscous dissipation. It is understood that "first constituent" and "second constituent," as used in this disclosure, can be one or more of several materials.

The method can additionally comprise the steps of mixing the first and second constituents, and homogenizing the resulting mixture. The homogenizing step may be performed substantially entirely in the extruder means. Alternatively, the first and and second constituents may be transferred from the extruder means to a holding vessel and at least part of the homogenizing step performed in such vessel.

The method can also comprise the step of vitrifying the first constituent in the extruder means using the second constituent and involves frictionally heating the second constituent in the extruder means. The introducing and melting steps can be performed substantially continuously and the method then further comprises the step of substantially continuously conveying the first and second constituents through the extruder means. The method additionally comprises the step of maintaining a maximum temperature between about 900 and 1050° C. in the extruder means. If necessary in addition to the heat produced by viscous dissipation, the method includes heating the first and second constituents by other, conventional means.

The method may also involve combining the first and second constituents and this can take place prior to the introducing step, during the introducing step or in the extruder means following the introducing step. The method can further comprise the step of encapsulating the first and second constituents following the melting step.

According to one embodiment of the method, a mass selected from the group consisting of glass and glass formers is admitted into, and melted in, extruder means to form a glass melt. The encapsulation is then performed using the glass melt. In accordance with another embodiment of the method, the glass melt from the first and second constituents is admitted into a container and molten lead is thereupon introduced into the container to encapsulate the first and second constituents.

The introducing step may involve admitting the first constituent into a first zone of the extruder means and admitting the second constituent into a second zone of the extruder means. The method can additionally comprise the steps of removing moisture from the first constituent in the first zone, discharging the moisture from the extruder means, and combining the first and second constituents in the second zone following the removing step. The method may also comprise the steps of generating at least one gas in the second zone and discharging such gas from the extruder means. The moisture can be discharged from the extruder means at a predetermined location of the first zone while the gas generated in the second zone can be discharged from the extruder means at a predetermined location of the second zone.

The method may further comprise the step of pelletizing the first and second constituents following the melting step. The first constituent may include a toxic waste, especially a radioactive waste. On the other hand, the second constituent preferably comprises a member of the group consisting of borosilicate glass and borosilicate glass frit.

Another aspect of the invention resides in a system for treating waste substances. The system comprises a first source of a first constituent selected from the group consisting of wastes, a second source of a second constituent selected from the group consisting of unmelted glass formers and unmelted glass, at least one extruder, and means for feeding the first and second constituents to the extruder while maintaining at least a portion of the first constituent in unmelted condition.

The extruder comprises a barrel and a conveying element in the barrel. The barrel and the conveying element can include a material, preferably a metal or metal alloy, having an operating temperature limit of about 900° C. or above.

The system can further comprise a second extruder, and a conduit connecting the second extruder to the first extruder. The first extruder may have a first outlet and the second extruder a second outlet, and the conduit can extend from the region of the second outlet to the region of the first outlet.

Similarly to the first extruder, the second extruder comprises a barrel and a conveying element in the barrel. The barrel and the conveying element of the second extruder can again include a material, preferably a metal or metal alloy, having an operating temperature limit of about 900° C. or above.

Additional features and advantages of the invention will be forthcoming from the following detailed description of preferred embodiments when read in conjunction with the accompanying drawings.

DESCRIPTION OF THE PREFERRED EMBODIMENTS

Figure 1:
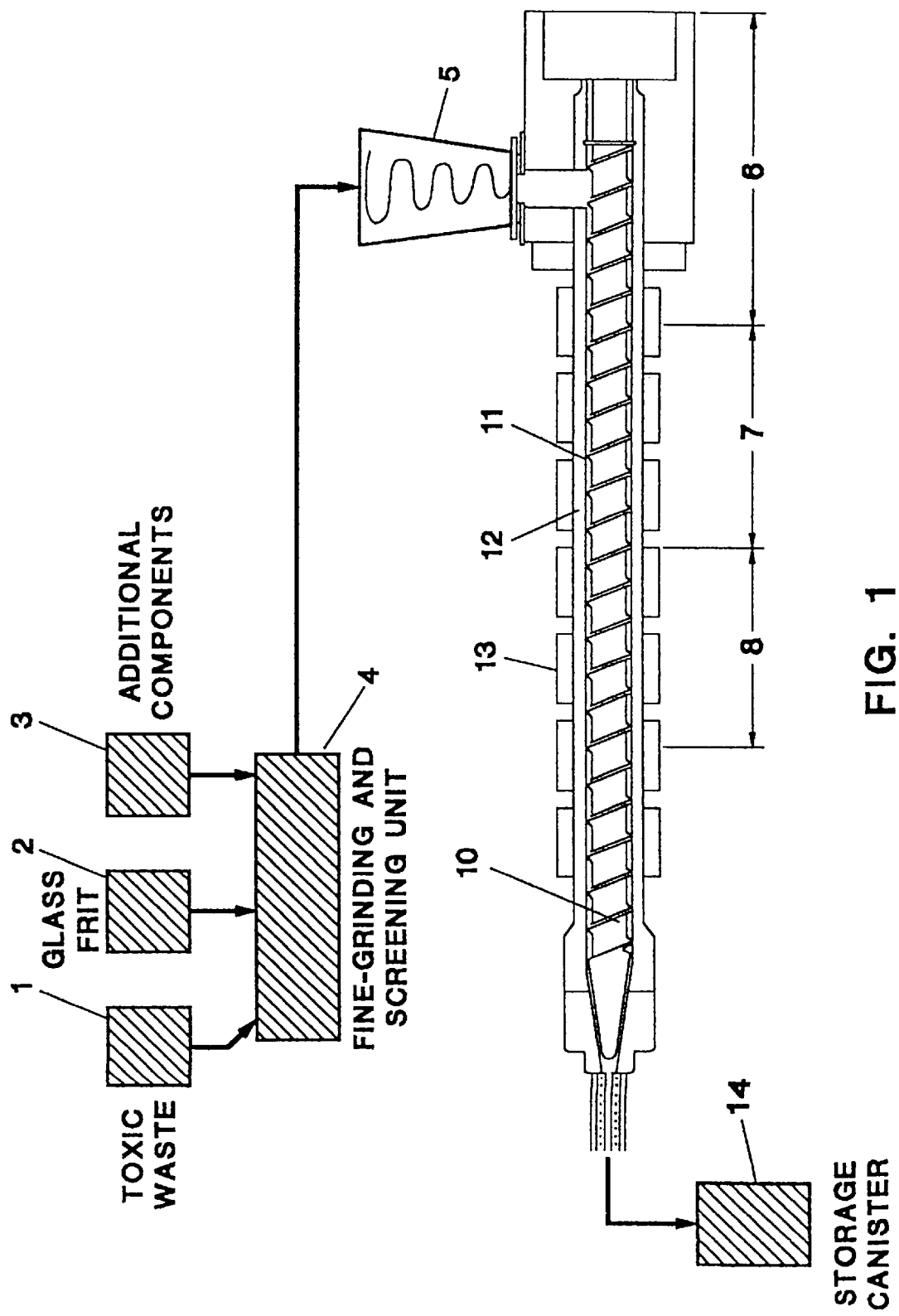
FIG. 1 is a schematic view of one embodiment of a system in accordance with the invention for vitrifying toxic wastes.

According to one aspect of the present invention, there is provided a process utilizing a single screw extruder for glass vitrification. As shown in FIG. 1, a metallic helical screw 10 is closely fitted into a metallic barrel 12. The invention is intended to provide a minimum of hold-up space within the extruder, and a powdered feed can help make this possible.

In the embodiment of the vitrification system shown in FIG. 1, toxic wastes from bin 1, a glass frit of desired composition from bin 2, and other desired components from bin 3 are metered into a fine-grinding and screening unit 4. The resultant powdered mix is fed into the extruder by means of crammer-feeder 5 which helps assure continuous feed of the feed mix under some pressure. The single screw extruder includes a feed zone 6, a compression zone 7 and a metering/mixing zone 8. As well understood in the art of extruders, a mixing head or other type of mixing device is designed into the metering section of the helical screw 10. The glass frit component of the feed mix is a thermoplastic inorganic material which melts upon heating. Heating takes place in the feed and compression zones of the extruder by surface friction upon the wall 11 of the extruder barrel. If necessary, melting is accelerated by providing heat transfer through the barrel 12 using other sources of heat generation, such as electrical heaters 13. Other, indirect sources of heating may be used, such as induction or radiant heat. As the feed mix is melted, a viscous mix is produced in the form of borosilicate glass that includes the toxic wastes, such as high level radioactive wastes, and its internal friction, called viscous dissipation, further heats the glass mix. The additional heat energy is created by the electrical power of the motor driving the screw and constitutes energy converted into frictional heat. The helical screw of the extruder generates pressure by exerting a drag flow upon the viscous glass melt. The screw moves the material down the screw channel and also provides pressure so that the vitrified waste melt can be forced into a storage canister 14 under whatever pressure is desired.

Thus, the high pressures and shear rates generated by an extruder can be utilized to lower the temperature of vitrification of toxic wastes. The high shear rates generated in the extruder are exploited to provide heat by viscous dissipation that is utilized to at least partially melt the glass, while the high pressures generated in the extruder make it possible to convey the molten mix at higher viscosities, and therefore at lower temperatures, than otherwise possible. Thus, one aspect of the concept of the invention involves producing sufficiently high shear rates in the glass/waste mix to generate heat by viscous dissipation and reduce the energy requirements of the melter; another aspect involves exploiting the high pressures available in an extruder to mix and convey the mixture at temperatures compatible with the structural limitations of the metals available for extruder construction.

As well understood in the art, viscous dissipation is the process by which heat is generated in a highly viscous fluid by the dissipative action of shearing forces acting on the fluid, such as can be produced in extruders. See R. B. Bird, W. E. Stewart and E. N. Lightfoot, "Transport Phenomena,"

J. Wiley & Sons (1960), pp. 276–279; and S. Middleman, "Fundamentals of Polymer Processing," McGraw-Hill Book Co. (1977), pp. 131–137 and 371.

Figure 2A:
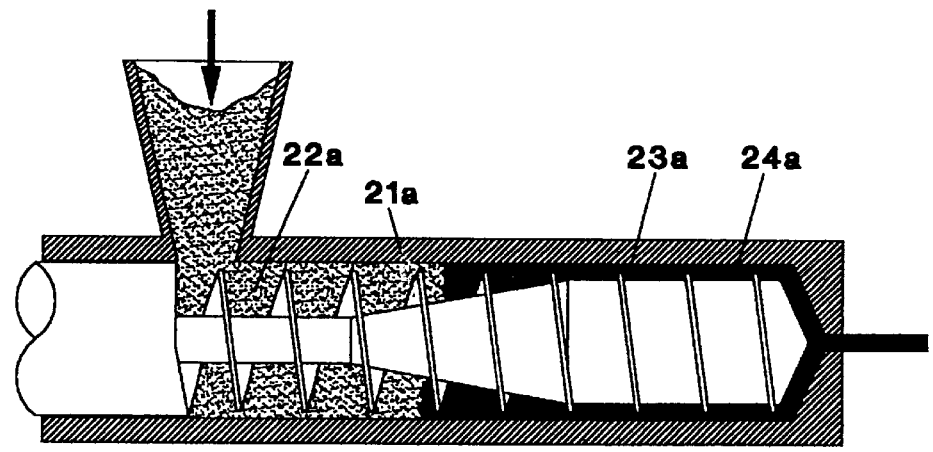
FIGS. 2a–2e show different extruders which can be used in a system according to the invention for vitrifying toxic wastes.

The process illustrated in FIG. 1 for the vitrification of nuclear and other toxic wastes is a simplified process. One it embodiment of an extruder for use in a system according to the invention is shown in FIG. 2a wherein the barrel 21a is of constant internal diameter throughout its length. The channel depth of the feed section 22a is large, decreases continuously in the compression section 23a and is small in the metering section 24a. This has the effect of generating high shear rates in the viscous glass melt existing in the metering section. The high shear rates, in turn, generate pressure and assist melt mixing.

Figure 2B:
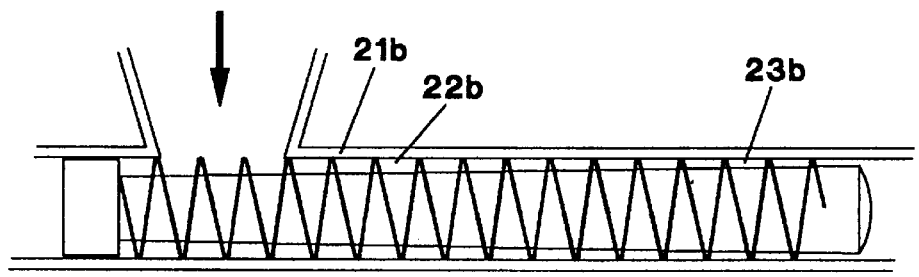

FIG. 2b shows a barrel 21b of constant diameter with a screw designed so that there is a continuous decrease in channel depth ranging from a reasonably large depth in the feed section 22b to a very small depth in the section 23b near the outlet.

Figure 2C:
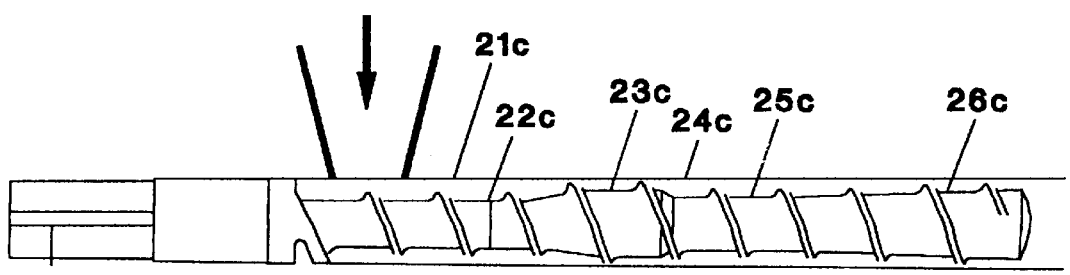

FIG. 2c shows a two-stage extruder screw in which a barrel 21c of constant diameter accommodates a screw having two sections. Each of the sections generates high shear rates and pressures although the shear rate between these sections is very low. Channel depth is large at location 22c but becomes small at location 23c. Location 24c has a very large channel depth which then begins to decrease at location 25c and becomes small again at location 26c. This design results in high shear rates at locations 23c and 26c with accompanying high pressures and good mixing. On the other hand, low pressure exists at location 24c where an outlet can be provided for the removal of any generated vapors.

Figure 2D:
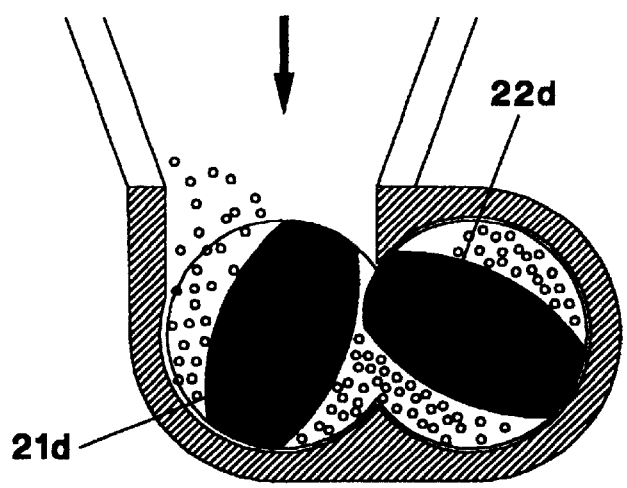
Figure 2E:
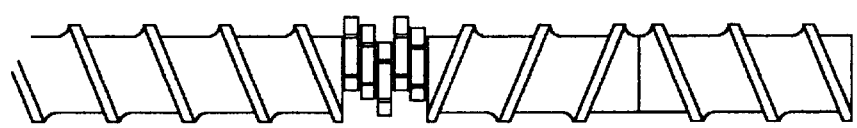

FIG. 2d shows a cross-section of a co-rotating twin screw extruder wherein a rotor 21d transfers the feed material to a second rotor 22d. This action continues throughout the extruder to provide good mixing without excessive shear rates, if so desired. Special mixing elements can be installed upon such twin screws as shown in FIG. 2e. Normally, either single screw or twin screw extruders can be designed to serve as vitrifying glass melters and/or to enhance conventional vitrification processes by operating in tandem with ceramic glass melters. A few examples are given below.

EXAMPLE 1

Figure 3:
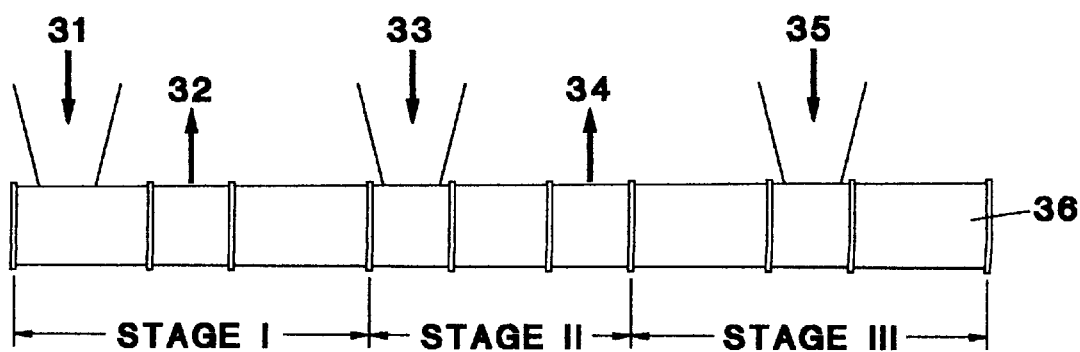
FIG. 3 is a schematic view of an extruder constituting part of a system in accordance with the invention for vitrifying toxic wastes.

FIG. 3 shows a high temperature twin screw extruder with multiple ports for operation with three stages. The feed, consisting of a sludge or concentrated solution of high level radioactive waste, is fed through feed port 31 and treated in Stage I at a temperature above 100° C. to drive off water through port 32. Glass frit and other components for glass formation are fed through feed port 33 and mixed with the nearly dry material from Stage I. The resulting mixture is further heated in Stage II to above 500° C. for melting and further mixing. Certain vapors such as nitrous oxide and carbon dioxide are formed during Stage II and removed through port 34. Glass formation is carried out in Stage III with any final material adjustments made by introducing additives through feed port 35. Stage III can operate at temperatures in the range of 800° C. to about 1050° C., which is within the operating temperature of metal alloys such as, for example, Inconel® 690, achieving said desired temperature near the outlet 36. Typical borosilicate glasses useful for the vitrification of high level radioactive wastes have viscosities as follows:

| Temperature (Centigrade) | Glass Melt Viscosity (Poises) |
|---|---|
| 1150 | 100 |
| 1050 | 500 |
| 990 | 1,000 |
| 900 | 9,000 |
| 850 | 60,000 |
| 800 | 800,000 |
| 750 | 8,000,000 |

With proper design, extruders can operate and convey material at any of the above viscosities. However, for metal construction, the temperature should be lower than about 1050° C. because most metal alloys have an operating limit of about 1075° C. Conventional ceramic glass melters operate at about 1150° C. in order to achieve the low viscosity of about 100 poises which is necessary for their successful operation. Extruders do not have this limitation because of the greater pressures achievable that allow mixing and conveying at higher viscosities. In addition, the high shear rates attendant to extruder operation produce heat by viscous dissipation that can be utilized to eliminate or minimize the heat requirements for vitrification.

EXAMPLE 2

Figure 4:
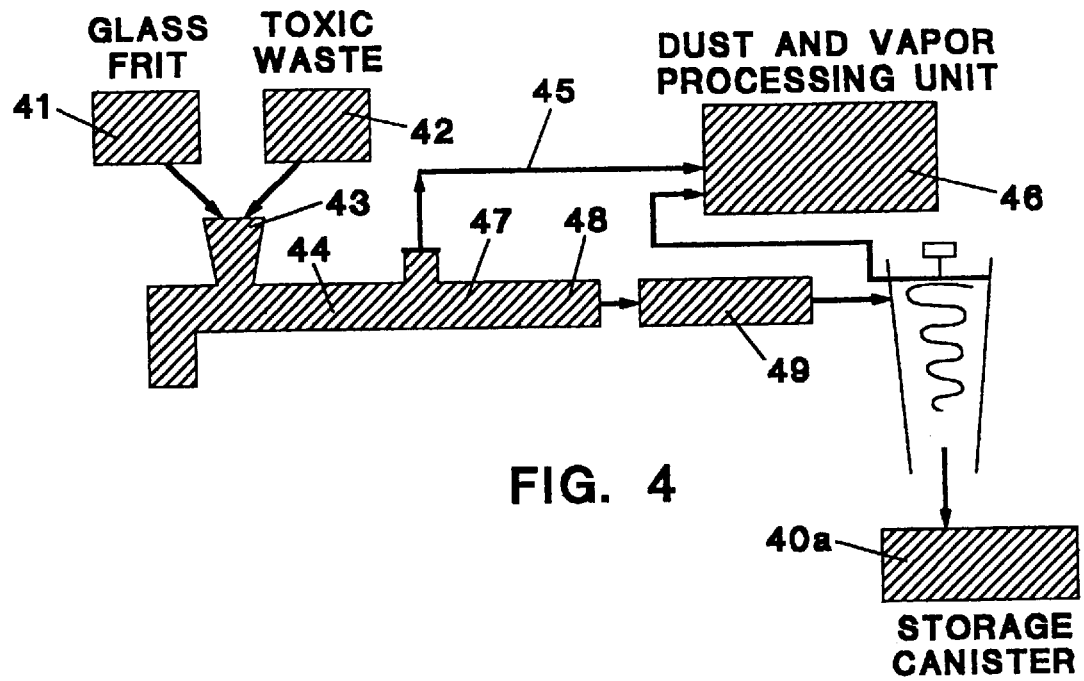
FIG. 4 is a schematic view of another embodiment of a system according to the invention for vitrifying toxic wastes.

FIG. 4 shows a toxic waste vitrification system wherein an extruder 44 feeds a stirred, vertical ceramic or metal glass melter 40. Toxic wastes from a bin 41 and glass frit from a bin 42 are metered into an enclosed feed unit 43 of the extruder 44. The front section of the extruder initiates glass melting and causes vapors to be exhausted through an outlet 45 to a dust and vapor processing unit 46. In section 47 of the extruder, which is maintained at a temperature of about 700 to 900° C., all glass is melted and more glass formed, in part from the toxic wastes. Mixing and homogenization continue in section 48 of the extruder which is held at about 900° C. The pressure generated in the extruder at 700 to 900° C. is sufficient to pump the melt through a metallic induction or radiant heater 49 which raises the melt temperature to about 900° C. to reduce the viscosity. The melt flows continuously into the vessel 40 which exhibits certain of the design features of conventional ceramic glass melters for the vitrification of high level radioactive waste. Thus, the vessel 40 has tapered walls and an elongated shape. However, the vessel 40 is considerably simpler in design than conventional ceramic glass melters because:

1) The vessel 40 can be constructed from metal alloys as the temperature is maintained at or below 900° C.
2) The vessel 40 contains no electrodes and stirrers are used only to maintain a uniform temperature within the vessel for final homogenization, rather than mixing during vilifications.
3) The vessel 40 serves as a holding tank for discharge into storage canisters 40a.

EXAMPLE 3

Figure 5:
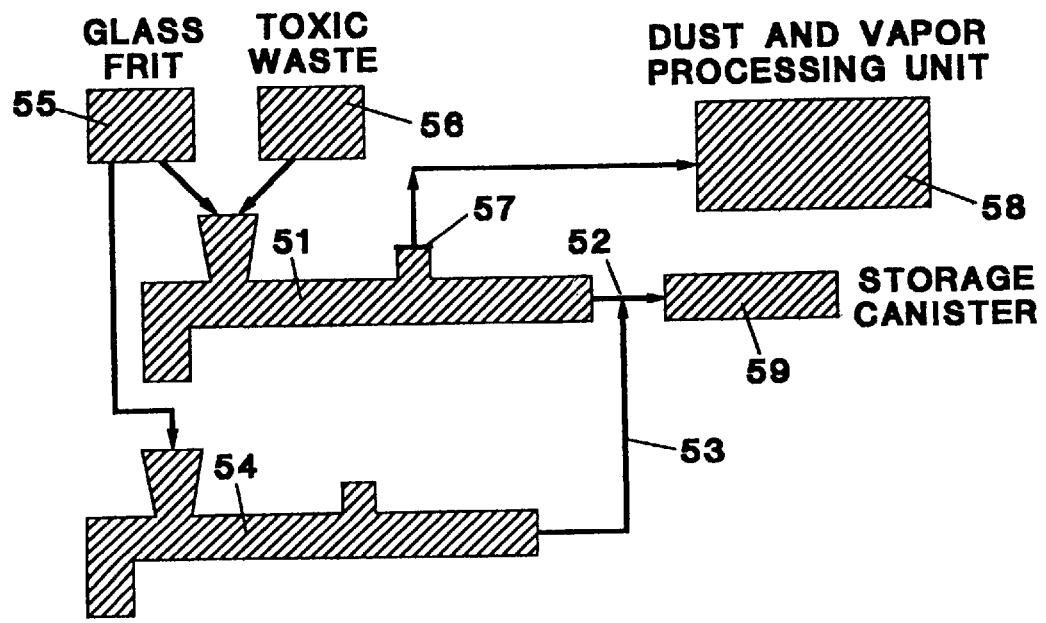
FIG. 5 is a schematic view of an additional embodiment of a system in accordance with the invention for vitrifying toxic wastes.

FIG. 5 illustrates a toxic waste vitrification system wherein an extruder 51 produces a toxic waste glass melt. The melt is encapsulated, at a location 52, by "pure" glass containing no toxic wastes. This glass is produced in a high temperature extruder 54 and fed to the location 52 through a pipe 53. Glass frit from a bin 55 and toxic wastes from a bin 56 are metered into the extruder 51. At the mid-section of the extruder 51, various gases and vapors are discharged through a port 57 to a dust and vapor processing unit 58.

Glass frit from the bin 55 is also supplied to the high temperature extruder 54 which produces the glass for use in the encapsulation. This vitrification process provides a toxic waste product which is surrounded by "pure" glass and is stored in a storage canister 59.

EXAMPLE 4

Figure 6:
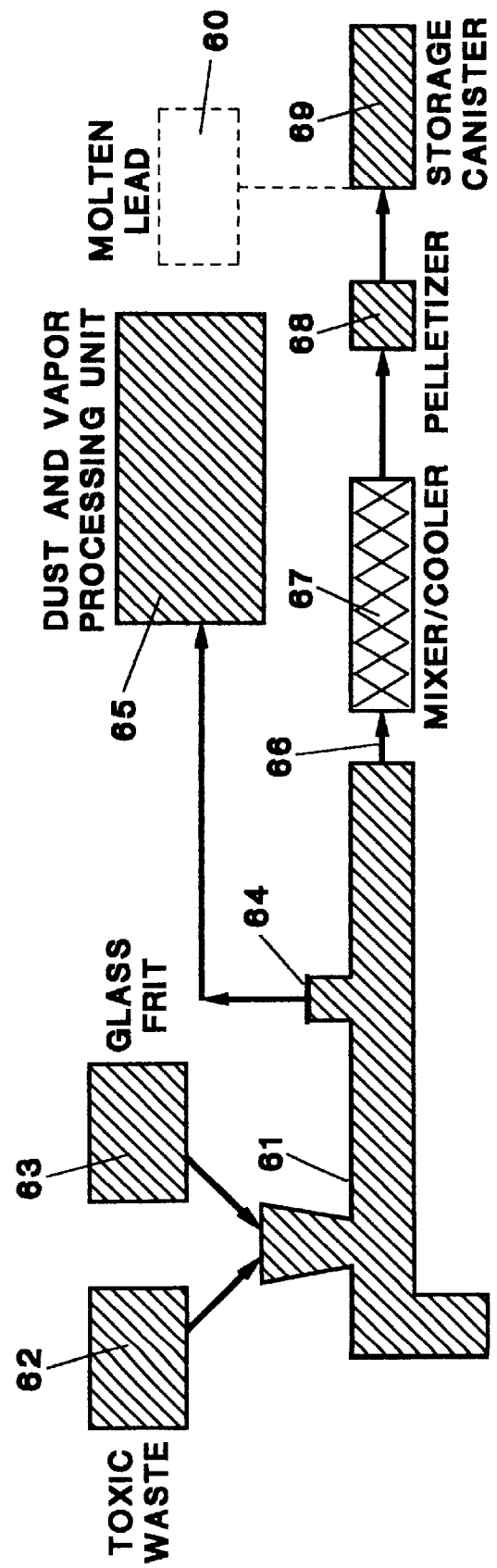
FIG. 6 is a schematic view of a further embodiment of a system according to the invention for vitrifying toxic wastes.

FIG. 6 shows a toxic waste vitrification system wherein an extruder 61 generates the desired vitrification product using toxic wastes from a bin 62 and glass frit from a bin 63. A portion of the glass in the vitrification product comes from the wastes. A port 64 exhausts gases and vapors to a dust and vapor processing unit 65. The product melt is fed through a pipe 66 to a static mixer/cooler 67 where it is cooled to nearly 700° C. so that a pelletizer 68 can convert the wastes into small pellets of about ¼-inch diameter. In order to operate the pelletizer 68, the viscosity of the melt must be very high, which is why it is necessary to cool the vitrified toxic wastes to the indicated temperature. The pellets are solidified with water or air prior to being poured into the storage canister 69. One option available in this process is to pour molten lead into the canister 69 from a container 60 in order to encapsulate the solid glass pellets and block their radioactive emissions. Lead has a melting point of about 327° C. Another option is to fit the canister 69 with inlets and outlets for pumping a gaseous or liquid fluid through the pelletized product in order to remove the heat generated by the encapsulated radioactive waste.

EXAMPLE 5

Figure 7:
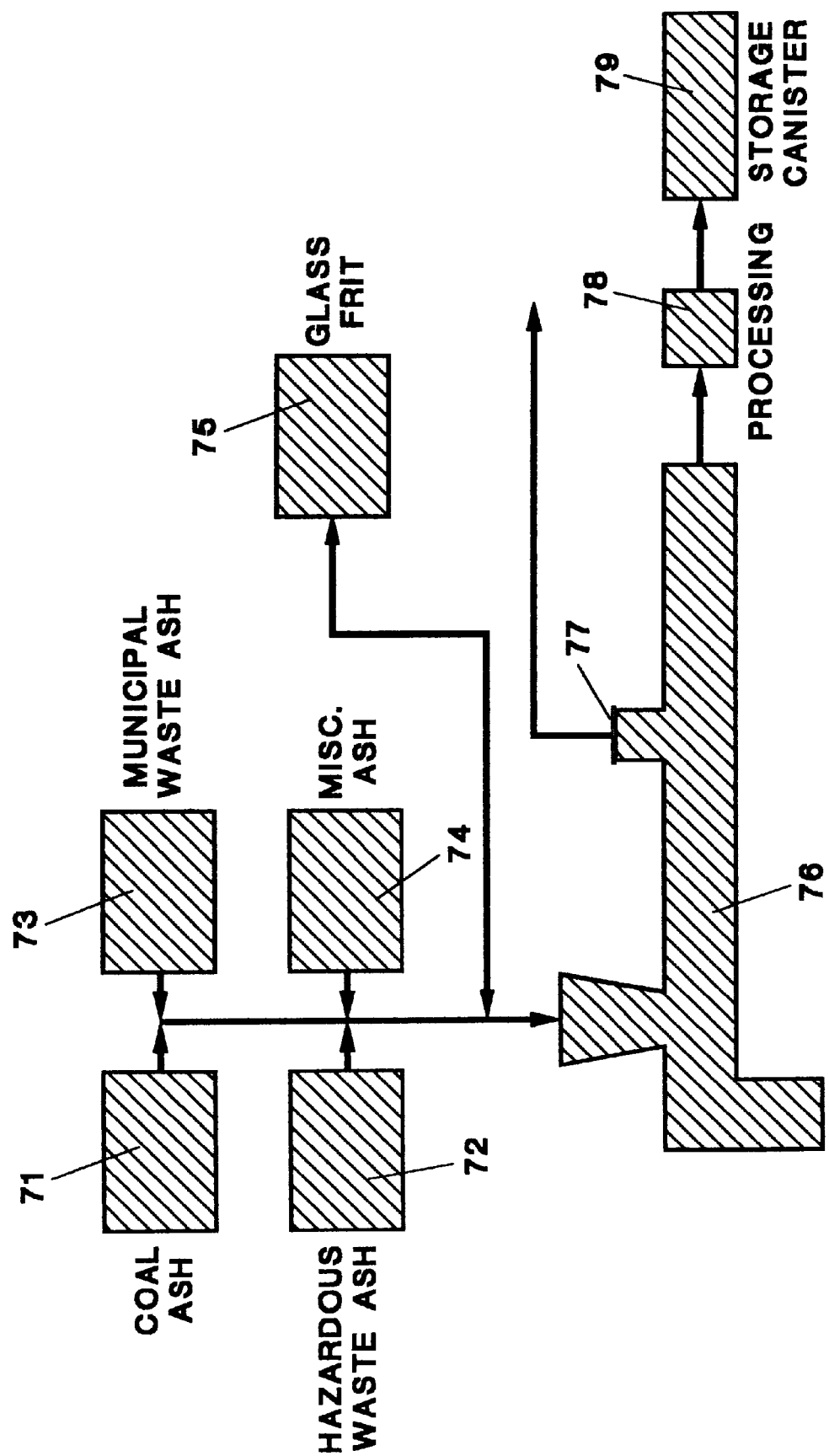
FIG. 7 is a schematic view of yet another embodiment of a system in accordance with the invention for vitrifying toxic wastes.

FIG. 7 illustrates a toxic waste vitrification system wherein toxic metals are available, or can be made available, in the form of ash from combustion and/or incineration processes. For example, coal ash from power plants may be fed from a bin 71; hazardous waste ash from incinerators burning industrial, medical and other wastes may be fed from a bin 72; ash from incinerated municipal solid wastes or fractions thereof may be fed from a bin 73; and ash from other sources may be fed from a bin 74. The ash is blended with glass frit from a bin 75 and metered continuously into an extruder 76 which is operated at 800 to 900° C. and has a vent 77 for residual moisture. The vitrified melt discharged from the extruder 76 can be introduced into a processing or treating vessel 78 for further processing prior to storage in a canister 79.

The vitrification process according to the invention is a continuous process. Thus, the introduction of feed into an extruder, and travel of the feed through the extruder and into a storage canister, proceed continuously.

The following comparison is provided to demonstrate the commercial value of the present invention. The glass melter for the vitrification of nuclear wastes at the Savannah River Plant, Aiken, S.C., is a typical commercial joule-heated ceramic-lined type of melter. It weighs 80 tons, the practical weight limit for moving into place by crane, and processes an upper limit of 228 pounds per hour of a 50 weight percent solids slurry of nuclear wastes. It develops essentially zero shear rate during melting, which requires an operating temperature of 1050° C. to 1150° C. to achieve a viscosity of the melt that is sufficiently low for vitrification.

In comparison, an extruder melter according to the invention can perform the same processing with a total weight of about five tons, which represents a 20-fold reduction in weight. Equally important, the extruder melter would contain over 100-fold less radioactive material in process at any given time. Thirdly, it can be operated at about 300° C. lower temperature, at 800–900° C., which allows an all-metal construction (rather than ceramic-lined) and has a much longer predicted life.

Such an extruder melter would have a diameter (inside) of three inches, and a length of nine feet. As those skilled in the art of extrusion would readily understand, these parameters would result in a length-to-diameter ratio of 36, which is sufficient for good feeding, good melting by friction and some barrel electrical heat, good temperature rise by viscous dissipation and barrel heat (if necessary by certain designs) and good mixing by high shear rates. The screw would have 36 turns (revolution) in its channel, consisting of 8 feed turns for good feeding, 8 compression turns for good operability during melting by combination of barrel friction and high shear rates, and 20 mixing turns for good mixing under high shear rates as the temperatures is increased by the high shear rates generated in this section.

Shear rates of about 150 sec$^{-1}$ can be generated with such an extruder melter design when operating in the range of 150–200 rpm screw speed. With this design, about 60–70 percent of the heat need for glass melting can be achieved by internal viscous dissipation, operating at about 850–900° C., with the balance coming from electrical heaters mounted on the outside of the extruder melter barrel. The extruder melter could be designed for even higher shear rates to provide all heat by viscous dissipation and barrel frictional heat in the compression set of turns described above by increased screw spin, and/or by providing a longer extruder melter with more screw turns, and/or by a screw design of larger diameter (wherein the same weight is substantially retained by making the screw hollow).

It is noted that during normal extruder operation, such as with plastic extrusion applications, the screw is shaped so as to reduce shear rate and minimize the heat produced by viscous dissipation, which would otherwise degrade the plastic. Heaters are only used to melt the plastic in the start-up phase of extrusion. Accordingly, normal length-to-diameter ratios of 20–24 to 1 are typically used, in contrast to the 36/1 or greater ratio described for the invention. Heating could also be controlled by limiting the extruder output and increasing the residence time by appropriate valving.

Large single-screw extruders with screws designed for high shear rates (e.g., a 12-inch diameter screw, driven by a 1200 hp motor, to homogenize and melt 7,000 lb/hr of low density polyethylene), generate so much heat by viscous dissipation that, even with maximum cooling of the barrel by cooling water, the extruder cannot be operated faster than 97 rpm without overheating the polyethylene above the 450° F. maximum allowable temperature.

Similarly, because polyvinyl chloride polymer is heat sensitive, single screw extruders generate too much viscous heating and destroy its good properties. So, a low shear rate twin-screw extruder must be used to process polyvinyl chloride plastics.

On the other hand, the high-shear characteristics of extruders are all useful for vitrification purposes. The high shear rates contemplated for an extruder melter not only result in melting by viscous dissipation, but inherently speed the glass melting rate, reduce residence time and volumes handled, and allow operation at much lower temperatures by being able to handle very viscous glass melts. Thus, equipment size, materials of construction, maintenance and equipment life are all greatly enhanced.

Various modifications are possible within the meaning and range of equivalence of the appended claims.

We claim:

1. A continuous method for vitrifying waste material comprising the steps of:
   (a) introducing the waste material and a vitrification constituent selected from the group consisting of glass and glass formers into an extruder;
   (b) conveying the waste material and the vitrification constituent through the extruder applying shear rates and pressures sufficiently high to cause melting of the vitrification constituent while maintaining a maximum temperature in the extruder below 1,050° C., thereby producing a vitrified waste product; and
   (c) removing the vitrified waste product from the extruder;
   wherein all steps are carried out on a substantially continuous basis.

2. The method of claim 1, further comprising the step of homogenizing the vitrified waste product.

3. The method of claim 2, wherein the homogenizing step is performed substantially entirely in the extruder.

4. The method of claim 2, further comprising the step of transferring the vitrified waste product from the extruder to a holding vessel and further homogenizing the vitrified waste product in the vessel.

5. The method of claim 1, further comprising the step of providing heat to the waste material and the vitrification constituent in the extruder by direct electric heating or by induction, radiant or other indirect heating.

6. The method of claim 1, wherein step (b) is carried out maintaining a maximum temperature in the extruder between about 900 and 1050 degrees Centigrade.

7. The method of claim 1, further comprising the step of combining the waste material and the vitrification constituent prior to step (a).

8. The method of claim 1, further comprising the step of combining the waste material and the vitrification constituent while carrying out step (a).

9. The method of claim 1, further comprising the step of encapsulating the vitrified waste product following step (c).

10. The method of claim 9, wherein said vitrified waste product is encapsulated using a substance selected from the group consisting of glass and lead, or mixtures thereof.

11. The method of claim 10, further comprising the steps of admitting a mass selected from the group consisting of glass and glass formers into additional extruder means, and melting said mass in said additional extruder means to form a glass melt; and wherein the encapsulating step is performed using said glass melt.

12. The method of claim 10, further comprising the steps of admitting said vitrified waste product into a container, and melting a mass of lead to form a lead melt; and wherein the encapsulating step comprises introducing said lead melt into said container.

13. The method of claim 1, wherein step (a) comprises admitting the waste material into a first zone of the extruder and admitting the vitrification constituent into a second zone of the extruder; and wherein step (b) further comprises the steps of removing moisture from the waste material in said first zone, discharging the moisture from the extruder, and combining the waste material and the vitrification constituent in said second zone following the moisture removing step.

14. The method of claim 13, further comprising the steps of generating at least one gas in the second zone of the extruder, and discharging said one gas from the extruder.

15. The method of claim 14, wherein said moisture is discharged from the extruder at a predetermined location of the first zone and said one gas is discharged from the extruder at a predetermined location of the second zone.

16. The method of claim 1, further comprising the step of pelletizing the vitrified waste product following step (c).

17. The method of claim 1, wherein said waste material is a toxic waste.

18. The method of claim 17, wherein said toxic waste comprises a radioactive waste.

19. The method of claim 1, wherein said vitrification constituent comprises frit.

20. The method of claim 2, wherein said vitrification constituent comprises a member of the group consisting of borosilicate glass and borosilicate glass frit.

21. The method of claim 1, wherein said step (b) is carried out with an extruder comprising a screw and screw channels less than one tenth the diameter of the screw.

* * * * *